Dec. 10, 1963     R. J. HARWOOD     3,113,793
POSITIONING MEANS FOR SEAT STRUCTURES AND THE LIKE
Filed Aug. 8, 1960

*INVENTOR.*
Richard J. Harwood
BY
*ATTORNEY*

United States Patent Office 3,113,793
Patented Dec. 10, 1963

3,113,793
POSITIONING MEANS FOR SEAT STRUCTURES AND THE LIKE
Richard J. Harwood, 1 Hawthorne, Wichita, Kans., assignor, by mesne assignments, to Richard J. Harwood and R. B. Parriott
Filed Aug. 8, 1960, Ser. No. 48,035
4 Claims. (Cl. 287—58)

This invention relates to positioning means, and more particularly to a means for adjusting and locking at a desired position a seat supporting structure.

Heretofore various types of positioning means have been provided for adjustable structures. These include relatively simple pin and eye arrangements on telescoping structures and wedge type locking means. The prior art devices require alignment of the locking means in specific positions, thus making it impossible to lock the adjusting means in every position over the entire length of the structure. Also, the prior art devices are structurally complicated, requiring an excessive number of parts and specially made structures to provide the adjustment features.

In accordance with the present invention a new adjusting and locking means has been provided which is particularly desirable for seat supporting structures and which can be locked in any position to make the seat a comfortable height for any user. Also, means have been provided to automatically release the locking mechanism and again place it in operating position. The adjusting structure of the invention is relatively simple structurally and economical to construct and build.

The adjusting and locking means of the invention includes tubes and telescoping posts. Locking means are mounted so as to be urged against the posts locking same and preventing downward movement of the posts in relation of the tubes during use. Means are provided to automatically release the locking means and return same to the working position when downward adjustment of the supported member is desired. The adjusting means of the invention is particularly useful where telescoping tubes and posts are used.

Accordingly it is an object of this invention to provide a new adjustable positioning device.

Another object of the invention is to provide a new adjustable support structure which can be locked and maintained at any position.

A still further object of the invention is to provide an adjustable support structure in which the locking means is normally urged into engagement and is automatically disengaged for resetting the height of the seat.

Another object of the invention is to provide an adjustable seat structure which is relatively simple in operation and eliminates the necessity of alignment of the locking means.

A further object of the invention is to provide an inexpensive locking means for adjustable structures.

Various other objects, advantages and features of the invention will become apparent from the following description taken in connection with the accompanying drawings, in which.

Figure 1:
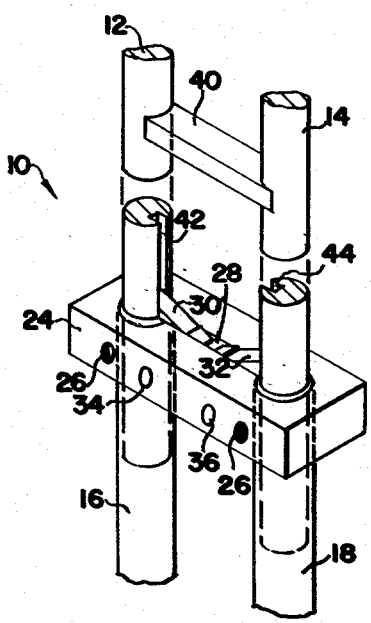
FIG. 1 is a partial isometric view showing the adjusting structure of the invention used with spaced tubes and posts.

The following is a discussion and description of a preferred specific embodiment of the new adjusting and locking means for seat structures and the like, such being made with reference to the drawings whereon the same reference numerals are used to indicate the same or similar parts and/or structure. It is to be understood that such discussion and description is not to unduly limit the scope of the invention.

Referring now to the drawings, the positioning means for seat structures and the like is shown in the drawings generally at 10. The preferred construction includes two spaced posts 12 and 14 which support a seat or the like, not shown. Two spaced tubes 16 and 18 are provided and are secured in their lower end portion to a suitable base, not shown. The tubes 16 and 18 serve as guide tubes and are preferably positioned so as to be parallel to each other and equal in height. Seat posts 12 and 14 and tubes 16 and 18 are dimensioned relative to each other so that the posts 12 and 14 are received within the tubes 16 and 18 respectively to be slidable therein. The upper end of each of the tubes 16 and 18 is preferably beveled as shown at 20 and 22 with the lower edges of the beveled portions facing each other.

A connecting base 24 having two spaced apertures 25 is provided and the apertures are spaced so that the base 24 receives the upper ends of the tubes 16 and 18. The tubes 16 and 18 are maintained in the base 24 by any suitable means, such as by the set screws 26. The base 24 has a slot 28 which extends between the apertures 25 and connects them.

Two lugs 30 and 32 are provided which are generally elongated and which are pivotally mounted at the inner end portion within the slot 28 in base 24 by pivot pins 34 and 36. The lugs are preferably spaced apart as shown in the drawings. A generally U-shaped spring member 38, which can be either a leaf spring or a simple wire spring member, is positioned between the lugs 30 and 32 and engages the inner ends of the lugs as shown.

Figure 2:
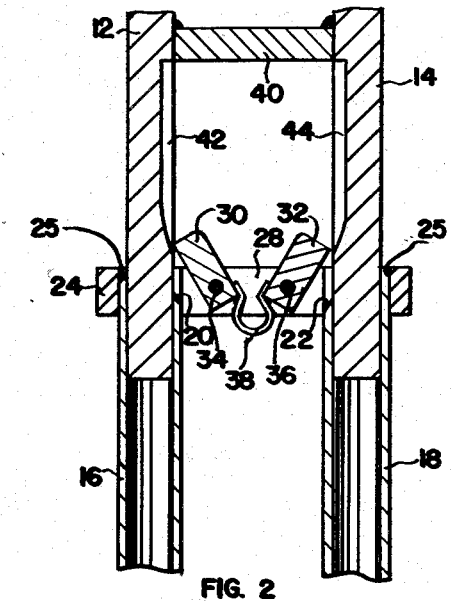
FIG. 2 is a cross section view showing the locking structure being disengaged to permit downward movement of the posts.

The posts 12 and 14 have a lug reset bar 40 rigidly secured thereto and extending therebetween. The posts 12 and 14 also have longitudinally extending grooves 42 and 44 respectively formed therein and they are preferably in facing relation when joined by the lug reset bar 40. The grooves 42 and 44 are tapered to the post surface at the lower ends and terminate abruptly at the upper end at the lug reset bar 40 as best seen in FIGS. 2, 3 and 4.

Figure 3:
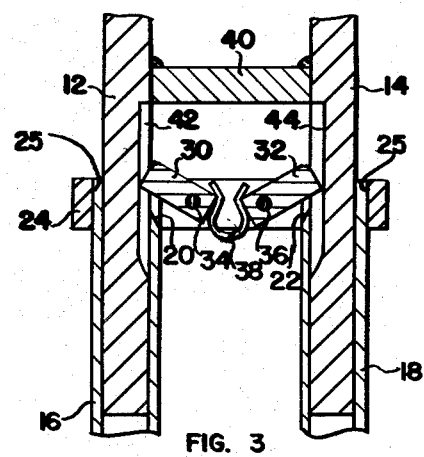
FIG. 3 is a cross section view showing the locking structure in engagement with the post limiting downward movement of the supporting posts.
Figure 4:
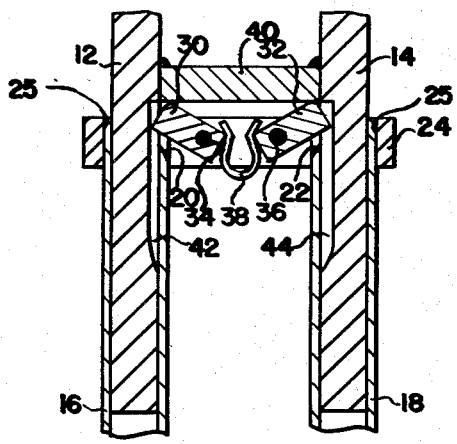
FIG. 4 is a cross section view showing the locking means being reset by the lug reset bar.

The normal operating position of the adjusting means is shown in FIG. 3. When in this position, the lugs 30 and 32 are being urged by the spring 38 into the grooves 40 and 42 in the posts 12 and 14. The edge of the lug reset bars 30 and 32 that engage the posts within the grooves 42 and 44 are relatively sharp and will bitingly engage the posts. As will be seen from FIG. 3, any weight pressed upon the post 12 and 14, such as by a seat mounted thereon, will urge the lugs 30 and 32 into even tighter engagement with the posts 12 and 14, thus positively locking the posts and eliminating further downward movement of the posts. When it is desired to raise the post, it is merely necessary to lift upwardly on the posts 12 and 14, or the structure mounted thereon, and the posts 12 and 14 will slide easily within the tubes 16 and 18 and along the lugs 30 and 32. When the posts 12 and 14 are again pressed downwardly the locking engagement previously described will again occur, preventing further downward movement of the posts 12 and 14.

When it is desired to lower the posts 12 and 14, the lugs 30 and 32 are disengaged from the grooves in the posts, the posts are moved to their lowermost position, and the lugs are again placed in contact with the posts. The preferred manner of doing this is shown in FIGS. 2 and 4. By raising the posts 12 and 14 to their highest position, as show in FIG. 2, the outer ends of the lugs 30 and 32 will be raised by the tapered end of the grooves 42 and 44 out of engagement with the posts 12 and 14. When this occurs, the ends of the spring member 38 will engage the sides of the lugs and maintain the lugs 30 and 32 out of engagement with the posts 12 and 14 and in the approximate vertical position shown in FIG. 2, which prevents the biting engagement of the lugs with the posts as previously described.

The seat posts 12 and 14 can then be lowered until the lug reset bar 40 engages the curved edges of the lugs 30 and 32. This is shown in FIG. 4 and results in the lugs 30 and 32 being returned to the grooves 42 and 44 and moves the spring member 38 so that it again engages the ends of the lugs and urges the lugs 30 and 32 outwardly into biting engagement with the post. The device is shown in its lowermost position in FIG. 4, and to further adjust the device it is merely necessary to lift upwardly until the desired position is reached, whereupon any weight placed upon the posts 12 and 14 will result in the wedging or binding action described and further downward movement will thus be prevented.

As will be seen from the foregoing description of the invention, a new and improved adjusting and locking means has been provided which is particularly desirable for seat structures and the like, and which utilizes a relatively small number of parts, is easy to construct and assemble, and is made so as to be locked in any vertical position during use. Also, the invention eliminates the necessity of aligning pin and eye means to provide positioning of seats and the like. Also, complicated wedging or the like has been eliminated, which decreases over all costs and simplifies operation of the device.

The construction described has been found particularly desirable with seats of exercising machines and the like, and such is shown in my copending application Exercise Machine, Serial No. 61,746, filed October 10, 1960. However, it will be apparent to those skilled in the art that this adjusting means can be used in any application to easily and conveniently provide adjustment and locking of a supported member. For example, the structure described can be used on stools, supports for platforms, bicycles, and a wide variety of other articles. Also, it will be apparent from the foregoing description that more or less than two tubes and posts can be used, if desired. Also, while the invention has been described in connection with a preferred specific embodiment thereof, it will be understood that this description is intended to illustrate and not to limit the scope of the invention, which is defined by the claims.

I claim:

1. Positioning means for seat structures and the like comprising, in combination, two spaced guide tubes, said tubes being parallel to each other and equal in height, the upper end of each of said tubes being beveled with the lower edges thereof in facing relation, a connecting base having two spaced apertures therein, said base receiving the upper end of each of said tubes in said apertures and being secured thereto, said base having a slot extending between said apertures, two elongated lugs, said lugs being spaced apart and pivotally mounted in opposed relation in said slot in said base, a generally U-shaped leaf spring member positioned between and engaging said lugs, said spring being positionable relative to said lugs to urge same into and out of a locking position, two spaced posts telescopically received within said tubes, and a lug reset bar extending between and rigidly secured to said posts, each of said posts having a longitudinally extending groove formed therein in facing relation when joined by said bar, each of said grooves being smooth-faced and tapered to the post surface on the lower end thereof and terminating abruptly at the upper end at said bar, each of said lugs having a straight sharp edge positionable within said grooves and in biting engagement with said smooth faces of said grooves in said posts to prevent downward movement of said posts with said tapered end of said grooves engageable with said lugs to move same from said grooves and out of engagement with said posts when said posts are raised and with said spring member engaged with said lugs and holding same out of engagement with said posts while said posts are lowered, said lug reset bar being engageable with said lugs to move same into said grooves and into biting engagement with said posts when said posts are lowered with said spring member engaged with said lugs and holding same in engagement with said posts.

2. Positioning means comprising, in combination, two spaced guide tubes, said tubes being parallel to each other, a base having spaced apertures therein, an end of each of said tubes being positioned in said apertures in said base and secured thereto, a slot in said base between said apertures, two posts, each of said tubes telescopically receiving one of said posts, a lug reset bar secured to and extending between said posts, each of said posts having a smooth faced longitudinally extending groove formed therein facing into said slot in said base and extending from said bar to a point intermediate the ends of said post, two lugs pivotally mounted in said slot in said base, each of said lugs having a sharp edge positionable in or out of engagement with said smooth faces of said grooves in said posts, and spring means positioned between and engaging said lugs, said spring means being constructed and positioned and urging said sharp edge of said lugs into biting engagement with said smooth faces of said grooves during movement of said posts in one direction relative to said tubes and urging said sharp edge of said lugs out of engagement with said posts during movement of said posts in the other direction relative to said tubes, said lugs being moved out of engagement with said posts upon engagement with the ends of said grooves in said post and moved into engagement with said posts when contacted by said lug reset bar.

3. Positioning means comprising, in combination, two spaced guide members, base means, said guide members being operatively connected to said base means, two posts, each of said guide members slideably receiving one of said posts, lug reset means secured to said posts to move therewith, each of said posts having a smooth faced longitudinally extending groove formed therein extending substantially from said reset means to a point intermediate the ends of said posts, two lugs pivotally mounted on said base means, each of said lugs having a sharp edge positionable in or out of biting engagement with said smooth faces of said grooves in said posts, and spring means engaging said lugs and positioned relative to said pivotal mounting of said lugs to urge said sharp edges of said lugs into biting engagement with said smooth faces of said grooves during movement of said posts in one direction relative to said guide members and urging said sharp edges of said lugs out of engagement with said smooth faces of said posts during movement of said posts in the other direction relative to said guide members, said lugs being moved out of biting engagement with said posts upon engagement with the ends of said grooves in said posts and moved into engagement with said posts when contacted by said reset means.

4. Positioning means comprising, in combination, base means, post means movably mounted relative to said base means, lug reset means with said post means, said post means having a smooth faced groove formed therein and extending substantially from said lug reset means to a point intermediate the ends of said post means, lug means pivotally mounted on said base means, said lug means having a portion positionable in or out of biting engagement with said face of said groove in said post means, and operating means engaging said lug means and positioned relative to the pivotal mounting of said lug means to urge said portion of said lug means into biting engagement with said face of said groove during movement of said post means in one direction relative to said base means and urging said portion of said lug means out of biting engagement with said smooth faces of said post means during movement of said post means in the other direction relative to said base means, said lug means being moved out of engagement with said post means upon engagement with the end of said groove in said post means and moved into engagement with said post means when contacted by said lug reset means.

References Cited in the file of this patent

UNITED STATES PATENTS

| | | |
|---|---|---|
| 178,727 | Brown et al. | June 13, 1876 |
| 698,721 | Lowe | Apr. 29, 1902 |
| 722,754 | Riley | Mar. 17, 1903 |
| 745,196 | Conover et al. | July 18, 1905 |
| 862,943 | Swart | Aug. 13, 1907 |
| 1,073,991 | Jones | Sept. 23, 1913 |
| 1,391,495 | Parsons | Sept. 20, 1921 |
| 1,838,352 | Anderson | Dec. 29, 1931 |